United States Patent
Closmann (10) Patent No.: US 7,647,698 B2
(45) Date of Patent: Jan. 19, 2010

(54) METHOD AND DEVICE FOR PRODUCING A CUTTING OR EMBOSSING ROLLER BY MEANS OF LASER RESURFACING WELDING

(75) Inventor: Michael Closmann, Raubach (DE)

(73) Assignee: Winkler + Dünnebier Aktiengesellschaft, Neuwied (DE)

( * ) Notice: Subject to any disclaimer, the term of this patent is extended or adjusted under 35 U.S.C. 154(b) by 742 days.

(21) Appl. No.: 11/215,324

(22) Filed: Aug. 30, 2005

(65) Prior Publication Data

US 2006/0042436 A1 Mar. 2, 2006

(30) Foreign Application Priority Data

Aug. 31, 2004 (DE) .................. 10 2004 042 492

(51) Int. Cl.
*B21K 1/02* (2006.01)
*A01B 29/04* (2006.01)

(52) U.S. Cl. ............. 29/895; 29/895.3; 29/895.31

(58) Field of Classification Search ............. 29/895, 29/895.3, 895.31, 895.32; 492/28, 30
See application file for complete search history.

(56) References Cited

U.S. PATENT DOCUMENTS

| | | | | |
|---|---|---|---|---|
| 3,905,283 A * | 9/1975 | Baker | ........... | 493/471 |
| 3,977,283 A * | 8/1976 | Helm | ........... | 83/341 |
| 4,393,738 A | 7/1983 | Heyden | | |
| 5,449,536 A * | 9/1995 | Funkhouser et al. | ........ | 427/597 |
| 5,855,149 A | 1/1999 | Islam et al. | | |
| 6,037,563 A * | 3/2000 | Foster et al. | ........... | 219/121.63 |
| 6,251,328 B1 | 6/2001 | Beyer et al. | | |
| 2005/0040147 A1* | 2/2005 | Hoebel et al. | ........... | 219/121.64 |
| 2006/0081571 A1* | 4/2006 | Hoebel et al. | ........... | 219/121.64 |
| 2006/0086705 A1* | 4/2006 | Alips et al. | ........... | 219/121.84 |
| 2007/0196561 A1* | 8/2007 | Philippi et al. | ........... | 427/8 |

(Continued)

FOREIGN PATENT DOCUMENTS

CN 1651606 A * 8/2005

(Continued)

OTHER PUBLICATIONS

Semjonov, S.A., 1988 "Laser Powder Deposit Welding at Cutting Tools" (2 pages) (w/concise explanation in English language).

(Continued)

*Primary Examiner*—Essama Omgba
(74) *Attorney, Agent, or Firm*—Collard & Roe, P.C.

(57) ABSTRACT

A method for producing a cutting or embossing roller having a cutting knife or embossing projection that projects out of the surface of a base body of the roller ensures the greatest possible optimal homogeneity of the cutting knife or the embossing projection, while minimizing production duration and costs. Single-layer or multi-layer application of the cutting knife or the embossing projection onto the roller base body occurs by laser resurfacing welding. Each layer is produced using an additional powdered material, which is melted in a melt bath at the weld point. The heat and/or light radiation emitted by the melt bath is detected, at least during application of each layer. Laser power is controlled or regulated as a function of the heat and/or light radiation emitted by the melt bath, so that melt bath temperature remains essentially constant during application of each layer.

9 Claims, 3 Drawing Sheets

U.S. PATENT DOCUMENTS

| | | | |
|---|---|---|---|
| 2008/0223832 A1* | 9/2008 | Song et al. | 219/121.66 |
| 2008/0296270 A1* | 12/2008 | Song et al. | 219/121.63 |
| 2009/0035448 A1* | 2/2009 | Flanagan et al. | 427/2.24 |

FOREIGN PATENT DOCUMENTS

| | | |
|---|---|---|
| DE | 29 07 325 A1 | 9/1980 |
| DE | 195 30 641 | 8/1995 |
| DE | 195 14 285 | 6/1996 |
| DE | 195 33 960 A1 | 3/1997 |
| DE | 198 32 185 A1 | 1/2000 |
| WO | WO 01/56736 | 8/2001 |
| WO | 2004/022816 | 3/2004 |

OTHER PUBLICATIONS

Hoffman, 1996—"Process Monitoring by Temperature Control During Generating with $CO_2$ Laser Radiation" (5 pages) (w/concise explanation in English language).

Photonik- 2004—"Laser Powder Deposit Welding at Cutting Tools" (1 page) (w/concise explanation in English language).

European Search Report for European Application No. EP 05 01 8760—dated Aug. 25, 2008, 3 pages (attached with translation).

* cited by examiner

METHOD AND DEVICE FOR PRODUCING A CUTTING OR EMBOSSING ROLLER BY MEANS OF LASER RESURFACING WELDING

CROSS REFERENCE TO RELATED APPLICATIONS

Applicant claims priority under 35 U.S.C. §119 of German Application No. 10 2004 042 492.6 filed Aug. 31, 2004.

BACKGROUND OF THE INVENTION

1. Field of the Invention

The present invention relates to a method and a device for producing a cutting or embossing roller by means of laser resurfacing welding, particularly for use in an envelope or label production machine, for cutting or embossing moving material webs or moving individual cutouts. The invention furthermore relates to a cutting or embossing roller produced using this method. The invention also relates to the use of a powder composition for producing a cutting or embossing roller of this type, by means of laser resurfacing welding.

2. The Prior Art

In envelope or label production machines, cutting or embossing rollers rotate at a relatively high speed of rotation, in order to perform cuts or embossed regions on moving webs of paper or moving individual cutouts. The paper to be cut or embossed contains metallic and non-metallic components as well as earths and clays. As a result, the cutting or embossing projections are exposed to significant stresses and subject to great wear. For this reason, it was usual, some time ago, to mill the knife blades of cutting rollers from solid material. Accordingly, the entire cutting roller consisted of a high-quality material that would actually have been required only for the cutting knife, i.e. the knife blade, according to the profile of requirements. The result was high costs in the production of the cutting rollers.

In DE 29 07 325 A1, it was therefore proposed to form the cutting knife by welding onto the base body of the roller welding beads made of a high-alloy, wear-resistant, and relatively hard steel. In this way, the base body of the roller could be produced from a lower-quality and therefore inexpensive material, as compared with the blade material. Application of the welding beads in the sense of this known method took place by means of electrical wire welding. This welding method requires a relatively large amount of time for applying the weld seams to the base body of the roller. This welding method also causes undesirable weld splashes on the surface of the base body of the roller, and not infrequently results in bubbles and/or cracks in the weld seams. These bubbles or cracks reduce the ability of the cutting knives, which are subject to great stress, to withstand mechanical stress, and thereby reduce their useful lifetimes.

Another welding method, namely laser resurfacing welding, is known from DE 198 32 185 A1, for example. There, the use of a diode laser, in particular, is proposed for carrying out the laser resurfacing welding. This laser melts an additional material in powder form, in order to thereby repair molding dies for injection molding and die-casting.

Another use of laser resurfacing welding, which process is actually known, is described in DE 195 33 960 A1, but not with a diode laser. There, metallic molding dies are produced, in that a powder that contains metal is melted in layers, in a melting region of the laser beam, and the applied layers are subsequently cut by machine. It was recognized that a not insignificant aspect in conducting the process of layer-by-layer construction of the work piece by means of melting the powder consists in the temperature of the work piece. Only if every layer is produced under the same conditions can the desired homogeneity with the related good mechanical properties be achieved. For this reason, a temperature measuring system is proposed. This temperature measuring system detects the surface temperature of the work piece after a layer is cut and causes the further layer-by-layer construction of the work piece to take place only if the detected temperature does not exceed a pre-determined value. This requirement, of course, results in time delays in the production sequence.

SUMMARY OF THE INVENTION

It is therefore an object of the present invention to provide a method and a device for producing a cutting or embossing roller, having a cutting knife or embossing projection that projects out of the surface of a base body of the roller, which guarantees the most optimal homogeneity of the cutting knife or the embossing projection that is possible, while simultaneously reducing the duration and costs of the production process.

These and other objects are accomplished according to one aspect of the invention, by a method for producing a cutting or embossing roller having a cutting knife or embossing projection that projects out of the surface of a base body of the roller. The method includes the steps of single-layer or multi-layer application of the cutting knife or the embossing projection onto the base body of the roller by means of laser resurfacing welding, whereby the layer, in each instance, is produced using an additional material in powder form, which is melted in a melt bath that occurs at the weld point; detection of the heat and/or light radiation emitted by the melt bath, at least during application of the layer, in each instance; and control or regulation of the power of the laser being used for laser resurfacing welding, as a function of the heat and/or light radiation emitted by the melt bath, in such a manner that the temperature of the melt bath remains essentially constant during application of the layer, in each instance.

In another aspect, a cutting or embossing roller is provided having a cutting knife or embossing projection that projects out of the surface of a base body of the roller, for cutting or embossing moving webs or individual cutouts. The roller is produced according to the method as described herein.

In another aspect, a device is provided for producing a cutting or embossing roller having a cutting knife or embossing projection that projects out of the surface of a base body of the roller, by means of laser resurfacing welding. The device includes a working head having a powder nozzle for supplying an additional material in powder form to a weld point; a laser for generating a laser beam, by means of which a melt bath can be produced at the weld point, in which the additional material in powder form is melted; a device for detecting the heat and/or light radiation emitted by the melt bath; and a device for controlling or regulating the power of the laser as a function of the heat and/or light radiation emitted by the melt bath.

In other aspects, use is made of powder compositions that contain less than or equal to either 90 wt.-% Fe, 70 wt.-% Co, or 70 wt.-% Ni, and, in addition, one or more alloy component(s) selected from the group consisting of B, Si, W, V, Cr, C, Si, Co, Mn, Mg, Ti, zirconium oxide and aluminum oxide, for producing a cutting knife or embossing projection of a cutting or embossing roller, which projects out of the surface of a base body of the roller, by means of laser resurfacing welding.

Further embodiments of the present invention are discussed below.

The method according to the invention produces the cutting knife or the embossing projection on the base body of the roller in a single-layer or multi-layer construction by means of laser resurfacing welding. In this connection, each layer is produced using an additional material in powder form, which is melted by the laser beam in a melt bath that occurs at the weld point. The heat and/or light radiation emitted by the melt bath represents a measure for the temperature of the melt bath. It is determined, i.e. detected according to the invention and the power, i.e. the energy level of the laser being used, is controlled or regulated as a function of the detected temperature of the melt bath. Specifically, the power is controlled or regulated so that the temperature of the melt bath remains essentially constant during application of the layer to the base body of the roller, in each instance.

Since the temperature of the melt bath is essentially constant during the resurfacing welding process, uniform melting of the metallic powder used as the additional material always takes place. This uniform melting in turn results in the desired homogeneity of the cutting knife or embossing projection that is produced, so that the mechanical properties of the cutting knife or the embossing projection can be significantly improved. The heat and/or light radiation emitted by the melt bath is constantly being detected, at least during the resurfacing welding process, and the power of the laser is controlled or regulated as a function of this detection. As a result, the process according to the invention can react to temperature variations of the melt bath in real time. This ability results in a corresponding acceleration of the resurfacing welding process, since no significant cooling or heating times have to be taken into consideration.

Laser resurfacing welding does not cause any significant mixing between the base material of the base body of the roller, on the one hand, and the melted powder, on the other hand. This lack of mixing means that the material of the cutting knife or embossing projection to be produced can be optimally adapted to the profile of requirements in each instance. Depending on the profile of requirements, there is the possibility of selecting the composition of the additional material in powder form in a suitable manner. Depending on the composition of the powder particles that form the additional material, the additional material has a different radiation absorption and reflection capacity. After the powder composition for a certain profile of requirements has been established, the wavelength of the laser light emitted by the laser is therefore preferably adjusted as a function of the radiation absorption and reflection capacity of the powder composition. The adjustment is made in a manner that the melting process of the powder takes place at the optimal degree of effectiveness.

Preferably, the laser resurfacing welding is carried out with a diode laser, particularly a low-energy diode laser. In this connection, the laser light generated using the diode laser preferably has a wavelength $\leq 1000$ nm, particularly a superimposition of wavelengths from the range of 808 nm to 980 nm. A diode laser having a superimposition of the wavelengths of 940 nm and 980 nm yielded good welding results in the sense of the present invention. A low-energy diode laser furthermore has the advantage that the base material of the base body of the roller is heated only slightly, i.e. that a temperature of the base body of the roller of approximately 50 degrees or 60 degrees C. is not exceeded during the resurfacing welding. A diode laser that is suitable for the purposes of the present invention is, for example, the laser having the model name LDF 1000-2500 of the company Laserline GmbH in Mülheim-Kärlich.

The cross-section of the laser beam of a diode laser usually has an elliptical shape. This shape results in a direction dependence of the laser beam cross-section. This dependence does not allow welding of a cutting knife that has a rectangular shape in a top view, for example, with a uniform width. Preferably, the cross-section of the laser beam of the diode laser is therefore homogenized. For example, the cross-section is converted to a circular, direction-independent cross-section using a light guide fiber. Such a cross-section allows resurfacing welding of a cutting knife having any desired geometry in a top view, with a constant width of the weld seam.

Depending on the desired height of the cutting knife or the embossing projection, the knife or projection is produced using a single-layer or multi-layer technique. As a result, the cutting knife or the embossing projection is already ready for the subsequent cutting machining after one-time resurfacing welding of a weld seam, or after several applications of a weld seam, one on top of the other. Depending on the powder composition, an individual weld seam can have a height in the range of 0.6 to 1.0 mm, and a width in the range of 2.5 to 3.0 mm.

In order to transport the additional material in powder form to the weld point, a pneumatic powder feed device is preferably provided. This device feeds the additional material in powder form to the working head from a supply container, using a transport gas. It is particularly advantageous to use such a gas composition for the transport gas that simultaneously functions as an inert gas, i.e. particularly prevents oxidation of the weld seam. By means of the selection of the composition of the transport gas, the waste heat stream from the weld point can furthermore be influenced. Alternatively, it is possible to arrange an inert gas feed device that is independent of and separate from the transport gas, in order to be able to select the composition of the transport gas independent of any inert gas function.

Since, in the method according to the invention, welding takes place not with wire materials but rather with an additional material in powder form, novel metal alloys that have never been produced before can be produced, which are not available on the market as semi-finished products, because their production is not possible.

For example, metal-based materials can be mixed with carbides, nitrides, or oxides (ceramic), and can be welded free of defects, if the process parameters are known and optimally coordinated with one another. These process parameters include the composition of the transport gas, the amount of powder, the laser power, the advance of the working head relative to the base body of the roller, and the inert gas. Also, subsequent machinability is also possible, particularly subsequent cutting machinability. The inert gas can be, for example, argon, helium, nitrogen, hydrogen, or a mixture of these gases.

Preferably, iron, cobalt, or nickel are suitable as the base material for the powder compositions. For example, the powder composition can contain less than or equal to 90 wt.-% iron or less than or equal to 70 wt.-% cobalt or less than or equal to 70 wt.-% nickel, with one or more additional alloy component(s), in each instance, which is/are selected from the group consisting of B, Si, W, V, Cr, C, Si, Co, Mn, Mg, Ti, zirconium oxide, and aluminum oxide. The hard material compounds that are produced can contain, in particular, chromium carbide, tungsten carbide, vanadium carbide, silicon and/or boron. Other alloy components are miscible. Zirconium oxide and/or aluminum oxide are possible as oxide inclusions.

It should be noted that the alloy components have degrees of absorption and reflection that depend very greatly on the laser being used. The alloy components and the laser must therefore fit with one another, so that there is sufficient weldability of the additional material in powder form.

The cutting knives or embossing projections that can be produced using the method according to the invention are free of cracks or other anomalies, in a metallurgical regard. They are particularly free of cracks or abnormalities in the region of the connection zone with the base material of the base body of the roller. They demonstrate a dendritic structure, between the needles of which carbides having a great hardness of up to 2000 HV occur, for example.

The device according to the invention, as a device for detecting the heat and/or light radiation emitted by the melt bath, preferably has an optical beam splitter and a measuring device for detecting a signal that corresponds to the temperature of the melt bath. In this connection, the beam splitter is disposed in the beam path of the laser light. A part of the radiation emitted by the melt bath returns to the working head and is deflected there, by the beam splitter of a measuring device, to detect a signal that corresponds to the temperature of the melt bath. This signal is finally passed to the control or regulation circuit of the laser. In this way, the power of the laser is throttled if a reference temperature is exceeded. The power is increased if the actual temperature is below the reference temperature. The energy level in the melt bath therefore remains essentially constant, so that the melting process of the additional material in powder form can run continuously.

BRIEF DESCRIPTION OF THE DRAWINGS

Other objects and features of the present invention will become apparent from the following detailed description considered in connection with the accompanying drawings it should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
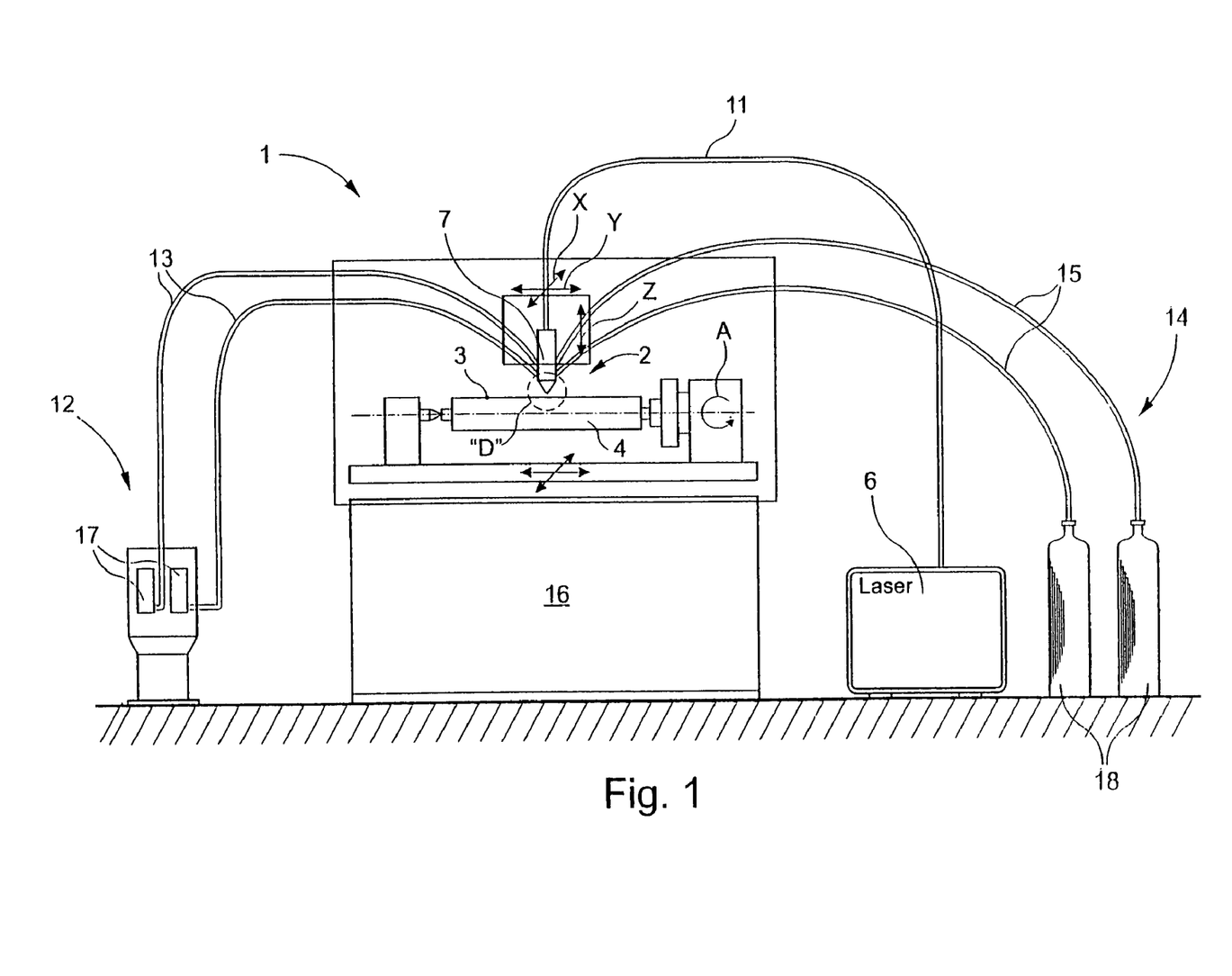
FIG. 1 is a schematic side view of an embodiment of a device according to the invention.

Turning now in detail to the drawings, FIG. 1 shows a device 1 for producing a cutting roller 2 having a cutting knife 5 that projects out of the surface 3 of a base body 4 of the roller. The cutting knife 5, which is also referred to as a knife blade, can be seen in FIG. 3. Cutting roller 2 is particularly used in envelope and label production machines.

Device 1 has a working head 7 that is mounted in a machine tool 16, preferably one that is computerized numerically-controlled (CNC controlled), and can be moved relative to the cylindrical base body 4 of the roller, which can be clamped in place so as to rotate about an axis of rotation A, in three spatial directions X, Y, and Z that stand perpendicular to one another, and are characterized with corresponding arrows in FIG. 1. Alternatively, working head 7 may be fixed in place, and base body 4 of the roller moved in the three spatial directions X, Y, and Z, relative to the fixed working head 7, and rotated about axis of rotation A. Alternatively, it is also possible to move working head 7 in the spatial directions X, Y, and Z, and about axis of rotation A, about a fixed base body 4 of the roller.

In the case of the exemplary embodiment shown, working head 7 is connected with various systems disposed outside of working head 7. As can be seen in FIG. 1, a laser 6, which is preferably a diode laser, is located to the right, next to machine tool 16. The laser beam generated by the diode laser 6 is passed to working head 7 by means of a light guide 11, preferably a glass-fiber cable. At the exit end of light guide 11, a laser beam having a circular cross-section, i.e. spot, enters into working head 7. Alternatively, diode laser 6 may be formed not as a separate unit, but rather integrated into working head 7, so that no room has to be made available for diode laser 6 outside of machine tool 16.

In FIG. 1, on the left, next to machine tool 16, there is a pneumatic powder feed device 12. Pneumatic powder feed device 12 feeds the additional material in powder form that is required for resurfacing welding to working head 7, using a transport gas. In the case of the embodiment shown, powder feed device 12 comprises two powder containers 17 as well as two powder transport lines 13 in the form of flexible hoses, which lead from the containers to working head 7. Transport gas to which pressure has been applied is passed through powder containers 17, seizes the powder particles contained in the containers as it passes through, and transports them to working head 7 through powder transport lines 13. It is particularly advantageous to select the composition of the transport gas so that it takes on not only the pure transport function but also, in addition, an inert gas function.

However, a separate inert gas feed device 14, as it can be seen at the right edge of FIG. 1, is also possible. In the embodiment shown, the inert gas feed device 14 includes two gas bottles 18 that contain the inert gas, as well as two inert gas transport lines 15 in the form of two flexible hoses. The inert gas, which is under pressure, flows to working head 7 through inert gas transport lines 15.

Figure 2:
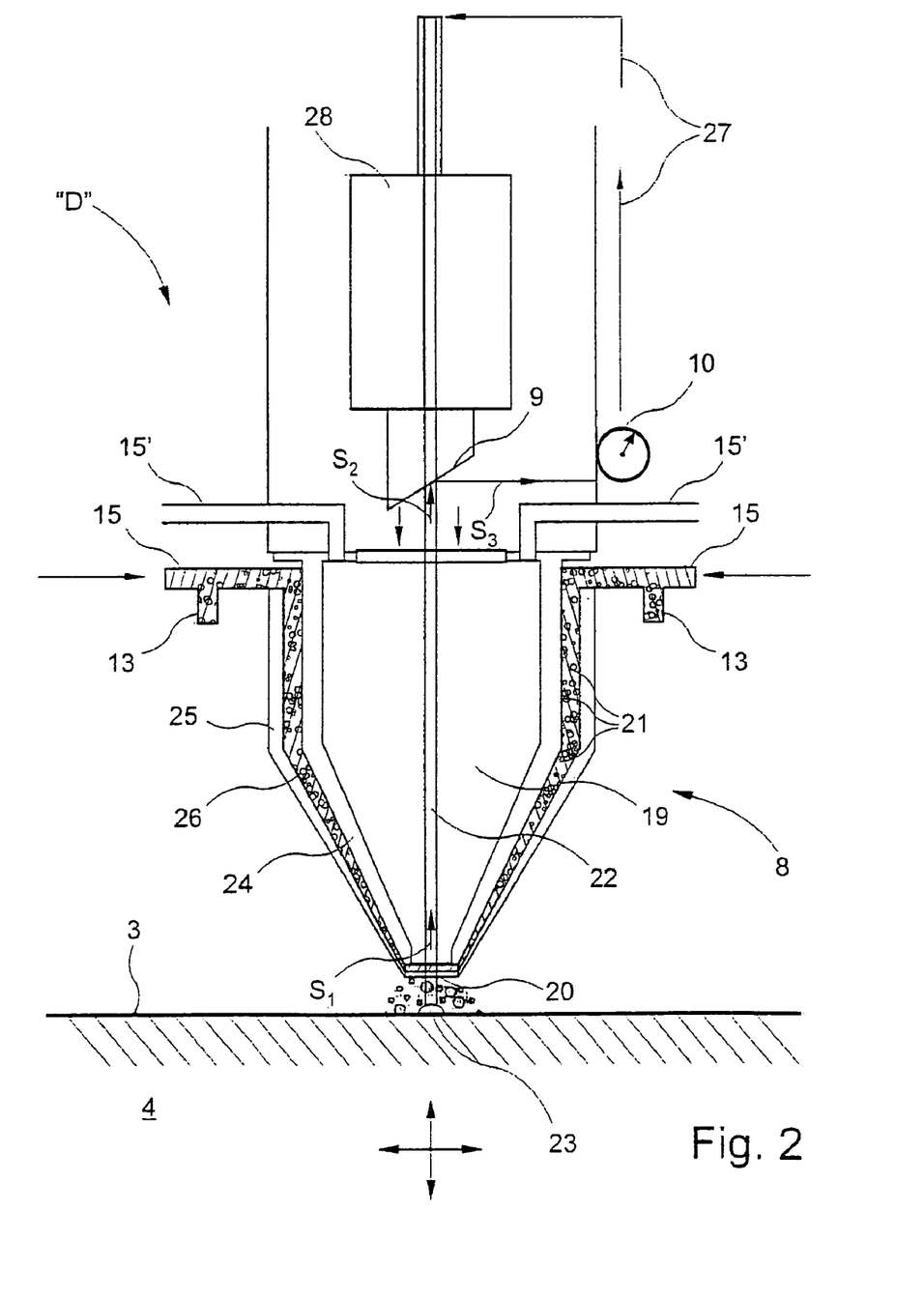
FIG. 2 is a schematic cross-sectional view of the working head of the device shown in FIG. 1.

FIG. 2 shows a schematic cross-sectional view of the detail "D" of working head 7 from FIG. 1. Working head 7 has a powder nozzle 8 at its lower end, which is provided with two nozzle channels 19 and 26 in its interior, which channels narrow conically downward to the nozzle exit opening 20 in FIG. 2. On the one hand, additional material in powder form, the powder particles 21 of which are shown in FIG. 2, is supplied to nozzle channel 26, which serves as an inert gas and powder transport channel, by means of the two powder transport lines 13. On the other hand, inert gas is supplied via the two inert gas lines 15. As can furthermore be seen in FIG. 2, the laser beam 22 generated by diode laser 6 passes through nozzle channel 19 in a straight line, and exits from nozzle exit opening 20 at the lower end of powder nozzle 8, together with powder particles 21 that are focused in a powder stream. In the region of the weld point, at the latest, i.e. in FIG. 2, below nozzle exit opening 20, powder particles 21 are melted by the heat energy of laser beam 22, so that a resurfacing weld seam 23 can be produced on surface 3 of base body 4 of the roller. Cutting knife 5, having any desired geometry in a top view, is built up from one or more resurfacing weld seams 23 disposed on top of one another, on surface 3 of roller body 4 of the roller. After completion of the resurfacing welding process, subsequent machining, preferably cutting, takes place, to produce the final cutting knife 5 having the desired blade geometry.

According to FIG. 2, powder nozzle 8 has an inside wall 24 as well as an outside wall 25. Between inside wall 24 and outside wall 25, there is the inert gas and powder transport channel 26 in the shape of an annular space. The cross-section of channel 26 narrows downward in FIG. 2, and finally opens into nozzle exit opening 20. Inert gas that shields the weld point is supplied to the inert gas and powder transport channel 26, by means of the two inert gas transport lines 15. The inert gas may be, for example, argon, helium, nitrogen, hydrogen, or mixtures of these gases. The powder is supplied to inert gas and powder transport channel 26 by means of powder transport lines 13. If the transport gas supplied by means of powder transport lines 13 takes over the inert gas function, a powder nozzle 8 can also be used without a separate inert gas line 15, i.e. without a separate connection for an inert gas line 15. In addition, inert gas that has been branched off from inert gas line 15 may be supplied to nozzle channel 19, by means of inert gas line 15'. Alternatively, a different inert gas may be supplied that differs in its composition from the inert gas supplied by means of inert gas line 15.

As is evident in FIG. 2, there is an optical beam splitter 9 in the beam path of laser beam 22, above nozzle channel 19, which splitter can be, for example, a mirror coated on one side, which is permeable for the laser beam impacting on the non-mirrored side. In a housing 28 above beam splitter 9, there is an optical system for optical processing, particularly focusing, of laser beam 22, which is not of greater interest here.

The melt bath of molten powder particles 21 that occurs at the weld point emits heat and/or light radiation into the surroundings. Part of this radiation gets into nozzle channel 19, according to the arrow $S_1$, counter to the running direction of laser beam 22, and impacts beam splitter 9, according to the arrow $S_2$. The splitter deflects the emitted heat and/or light radiation, according to the arrow $S_3$, to a measuring device 10 that detects a signal from the radiation supplied to it. This signal represents a measure of the temperature of the melt bath at the weld point. This signal is finally passed to a control or regulation circuit 27 that is schematically indicated in FIG. 2.

Control or regulation circuit 27 contains a comparator that determines whether or not the actual temperature of the melt bath corresponds to a pre-determined reference temperature. Depending on the deviation of the actual temperature from the reference temperature, the power of diode laser 6 is controlled or regulated so that a correction of any deviations from the reference temperature is possible. The reference temperature is provided as a default value to control or regulation circuit 27 as a function of various welding parameters. These parameters include, for example, the composition of powder particles 21, the composition of the transport gas, the composition of the inert gas, the type of material of base body 4 of the roller, as well as the type and wavelength of laser beam 22. Measuring device 10 is preferably an optical sensor. The control or regulation circuit is preferably a direct voltage control or regulation circuit that influences the laser power.

Figure 3:
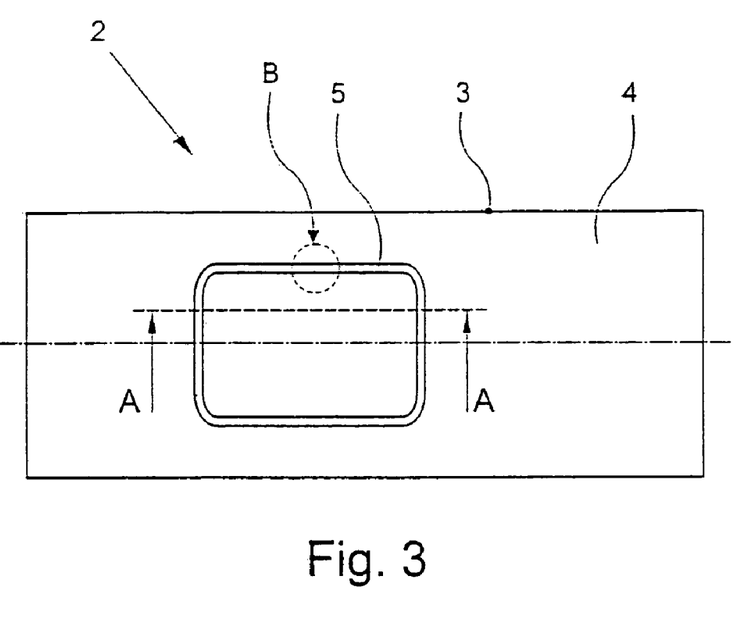
FIG. 3 is a top view of a cutting roller produced according to the invention, having a rectangular cutting knife.

FIG. 3 shows a top view of a cutting roller 2 produced according to the invention, having a cutting knife 5 produced by means of laser resurfacing welding, which essentially has a rectangular shape. Cutting knives 5 having this geometry are required, for example, in envelope production machines, for cutting address windows out of envelopes.

Figure 4:
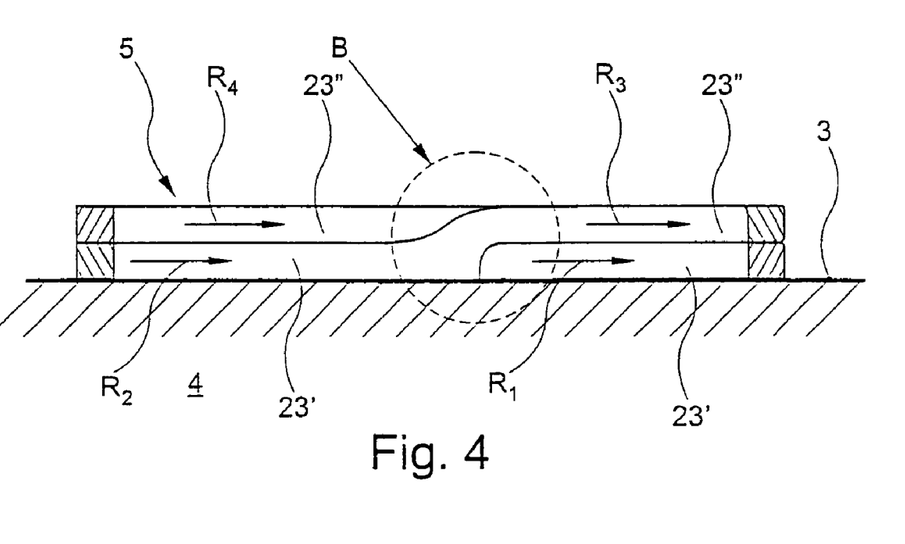
FIG. 4 is an enlarged cross-sectional view according to section A-A in FIG. 3.

In FIG. 4, which shows a cross-sectional view according to the section A-A in FIG. 3, the structure of cutting knife 5 can be seen. In the case of the embodiment shown, it is made up of two resurfacing weld seams 23' and 23" disposed over, i.e. on top of one another. The arrows $R_1$, $R_2$, $R_3$, and $R_4$ characterize the movement direction of working head 7 and/or powder nozzle 8 in the production of cutting knife 5 that is shown.

First, the resurfacing weld seam 23' was produced directly on surface 3 of base body 4 of the roller, in accordance with the arrows $R_1$ and $R_2$. Because of the relatively cold base body 4 of the roller, a relatively great heat transport away from the weld point, in each instance, and therefore from the melt bath, takes place. As a result, the energy supplied by way of the laser beam must balance out this heat loss of the melt bath, and the power of diode laser 6 must be set high, accordingly.

When the closed, circumferential rectangular contour of resurfacing weld seam 23' is closed, i.e. during the transition into the phase of production of the second resurfacing weld seam 23", the heat removal conditions change.

In the transition region B indicated in FIG. 3 and FIG. 4, in particular, between resurfacing weld seam 23' and resurfacing weld seam 23", a non-homogeneous point occurs. This non-homogeneous point means mechanical weakening of cutting knife 5, if the process of melting powder particles 21 is not continued continuously, as in the production of resurfacing weld seam 23'. Since the melt bath is no longer in direct contact with surface 3 of base body 4 of the roller in the transition region B and afterwards, during the production of resurfacing weld seam 23", but rather with resurfacing weld seam 23', which is still warmer, the heat removal from the melt bath is reduced. This reduction means that the melt bath would become warmer if diode laser 6 were to be operated at the same power. This increase in temperature in turn would have the result of a different type of melting process of powder particles 21, the composition of which has remained unchanged. This difference would result in undesirable non-homogeneities and mechanical weakening. According to the invention, therefore, the actual temperature of the melt bath is therefore constantly detected, in real time, so that it can be controlled or regulated to the pre-determined reference temperature immediately, without any significant time delay. The result is cutting knives 5 that can withstand great mechanical stress, and are also highly wear-resistant.

The present invention brings significant advantages with it in the case of cutting and embossing rollers both for envelope production and label production. As an example, reductions in delivery lead times and production costs should be mentioned. In particular, all costs for subsequent hardening of the cutting knives or embossing projections are eliminated, since such hardening is no longer necessary. Furthermore, subsequent repairs of the cutting or embossing. rollers are possible. Because of the possibility of repairing cutting or embossing rollers that have already been machined to completion, the production risk can also be significantly reduced. Embossing projections on embossing rollers also do not have to be milled from solid material. It is possible to point-weld the geometry of embossing projections, and to point-machine the embossing projections.

Although only a few embodiments of the present invention have been shown and described, it is to be understood that many changes and modifications may be made thereunto without departing from the spirit and scope of the invention as defined in the appended claims.

What is claimed is:

1. A method for producing a cutting or embossing roller having a cutting knife or embossing projection that projects out of a surface of a base body of the roller comprising the following steps:
    (a) applying by laser resurfacing welding at least one layer of the cutting knife or the embossing projection onto the base body of the roller, each layer of the at least one layer being produced using an added material in powder form melted in a melt bath at a weld point;

(b) detecting heat or light radiation emitted by the melt bath at least during application of each layer;

(c) controlling or regulating power of a laser used in the laser resurfacing welding as a function of the heat or light radiation emitted by the melt bath so that melt bath temperature remains substantially constant during application of each layer; and (d) setting a wavelength of a laser beam emitted by the laser as a function of an absorption capacity of powder particles that form the added material in powder form.

2. The method according to claim 1, wherein a diode laser is used for the laser resurfacing welding.

3. The method according to claim 2, wherein laser light having wavelengths of 808 nm to 980 nm is generated with the diode laser.

4. The method according to claim 2, wherein laser light having superimposed wavelengths of 940 nm and 980 nm is generated with the diode laser.

5. The method according to claim 2, wherein the diode laser generates a laser beam having a cross-section and the cross-section is converted to a circular cross-section by means of a light guide.

6. The method according to claim 1, wherein the added material in powder form is passed to the weld point by a transport gas that simultaneously functions as an inert gas for shielding the weld point.

7. The method according to claim 1, wherein a powder composition is used as the added material in powder form, the powder composition containing less than or equal to 90 wt.-% Fe and, in addition, one or more alloy components selected from the group consisting of B, Si, W, V, Cr, C, Co, Mn, Mg, Ti, zirconium oxide and aluminum oxide.

8. The method according to claim 1, wherein a powder composition is used as the added material in powder form, the powder composition containing less than or equal to 70 wt.-% Co and, in addition, one or more alloy components selected from the group consisting of B, Si, W, V, Cr, C, Co, Mn, Mg, Ti, zirconium oxide and aluminum oxide.

9. The method according to claim 1, wherein a powder composition is used as the added material in powder form, the powder composition containing less than or equal to 70 wt.-% Ni and, in addition, one or more alloy components selected from the group consisting of B, Si, W, V, Cr, C, Co, Mn, Mg, Ti, zirconium oxide and aluminum oxide.

* * * * *

UNITED STATES PATENT AND TRADEMARK OFFICE
CERTIFICATE OF CORRECTION

PATENT NO. : 7,647,698 B2
APPLICATION NO. : 11/215324
DATED : January 19, 2010
INVENTOR(S) : Michael Closmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Sixteenth Day of November, 2010

David J. Kappos
*Director of the United States Patent and Trademark Office*